United States Patent
Hashimoto et al.

(10) Patent No.: US 7,330,777 B2
(45) Date of Patent: Feb. 12, 2008

(54) ROBOT COORDINATED CONTROL METHOD AND SYSTEM

(75) Inventors: Yoshiki Hashimoto, Kanagawa (JP); Tomoki Ohya, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/467,364

(22) Filed: Aug. 25, 2006

(65) Prior Publication Data
US 2007/0050085 A1 Mar. 1, 2007

(30) Foreign Application Priority Data
Aug. 26, 2005 (JP) .............................. 2005-245692

(51) Int. Cl.
*G05B 19/04* (2006.01)
*G05B 19/418* (2006.01)

(52) U.S. Cl. ............... 700/247; 700/245; 700/248; 700/251; 700/257; 700/258; 700/259; 700/260; 700/262; 700/264; 318/568.12; 318/568.13; 318/568.21; 318/568.25; 901/1; 901/2; 901/7

(58) Field of Classification Search ............ 700/245, 700/247, 248, 251, 257, 258, 259, 260, 262, 700/264; 318/568.12, 568.13, 568.16, 568.21, 318/568.25; 901/1, 2, 7
See application file for complete search history.

(56) References Cited

U.S. PATENT DOCUMENTS 6,374,155 B1 * 4/2002 Wallach et al. ............ 700/245
6,484,083 B1 * 11/2002 Hayward et al. ............ 701/50
6,496,755 B2 * 12/2002 Wallach et al. ............ 700/245
6,836,701 B2 * 12/2004 McKee ....................... 700/245
7,054,716 B2 * 5/2006 McKee et al. .............. 700/245

FOREIGN PATENT DOCUMENTS

JP 2003-145462 A 5/2003

OTHER PUBLICATIONS

Elhajj et al., Supermedia-Enhanced internet-based telerobotics, 2003, IEEE, p. 396-421.*
Amin-Javaheri et al., Systolic architectures for the manipulator inertia Matrix, 1989, IEEE, p. 939-951.*

* cited by examiner

*Primary Examiner*—Thomas Black
*Assistant Examiner*—McDieunel Marc
(74) *Attorney, Agent, or Firm*—Lowe, Hauptman, Ham & Berner, LLP

(57) ABSTRACT

A reference signal is transmitted from one of a plurality of robot control devices connected by communication connecting device to the other robot control device. The timing of generation of an operation basic period signal in each of the other robot control devices is synchronized with the timing of generation of an operation basic period signal in the one of the plurality of robot control devices, based on a time interval from generation of the operation basic period signal until transmission of the reference signal in the one of the plurality of robot control devices, a time interval from generation of the operation basic period signal until reception of the reference signal in each of the other robot control devices, and a communication delay time required for communication between the one of the plurality of robot control devices and each of the other robot control devices.

7 Claims, 7 Drawing Sheets

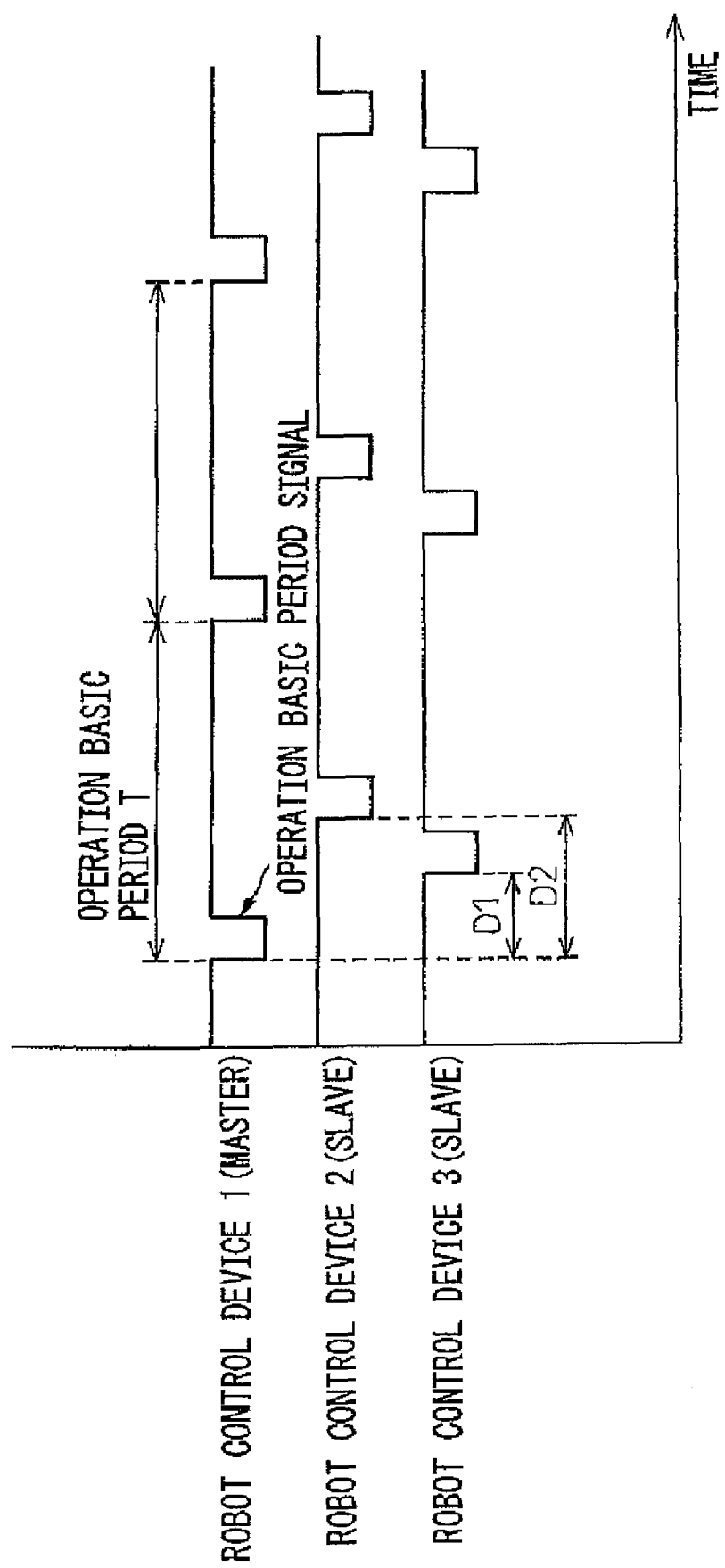

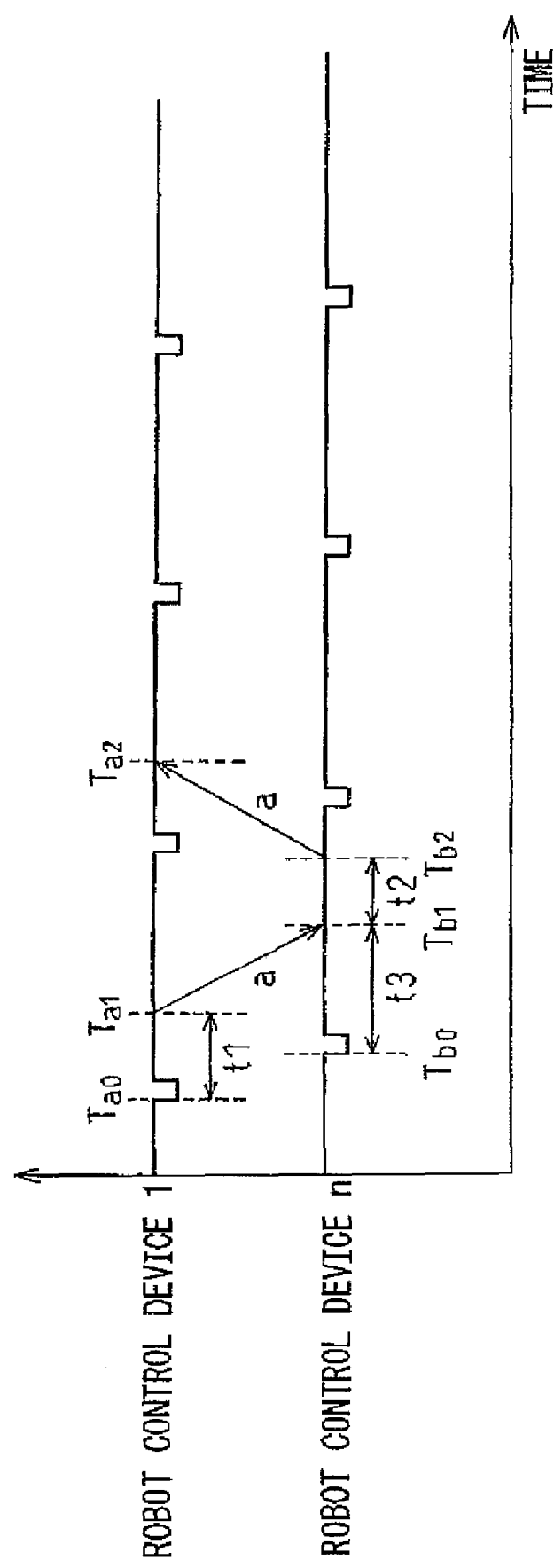

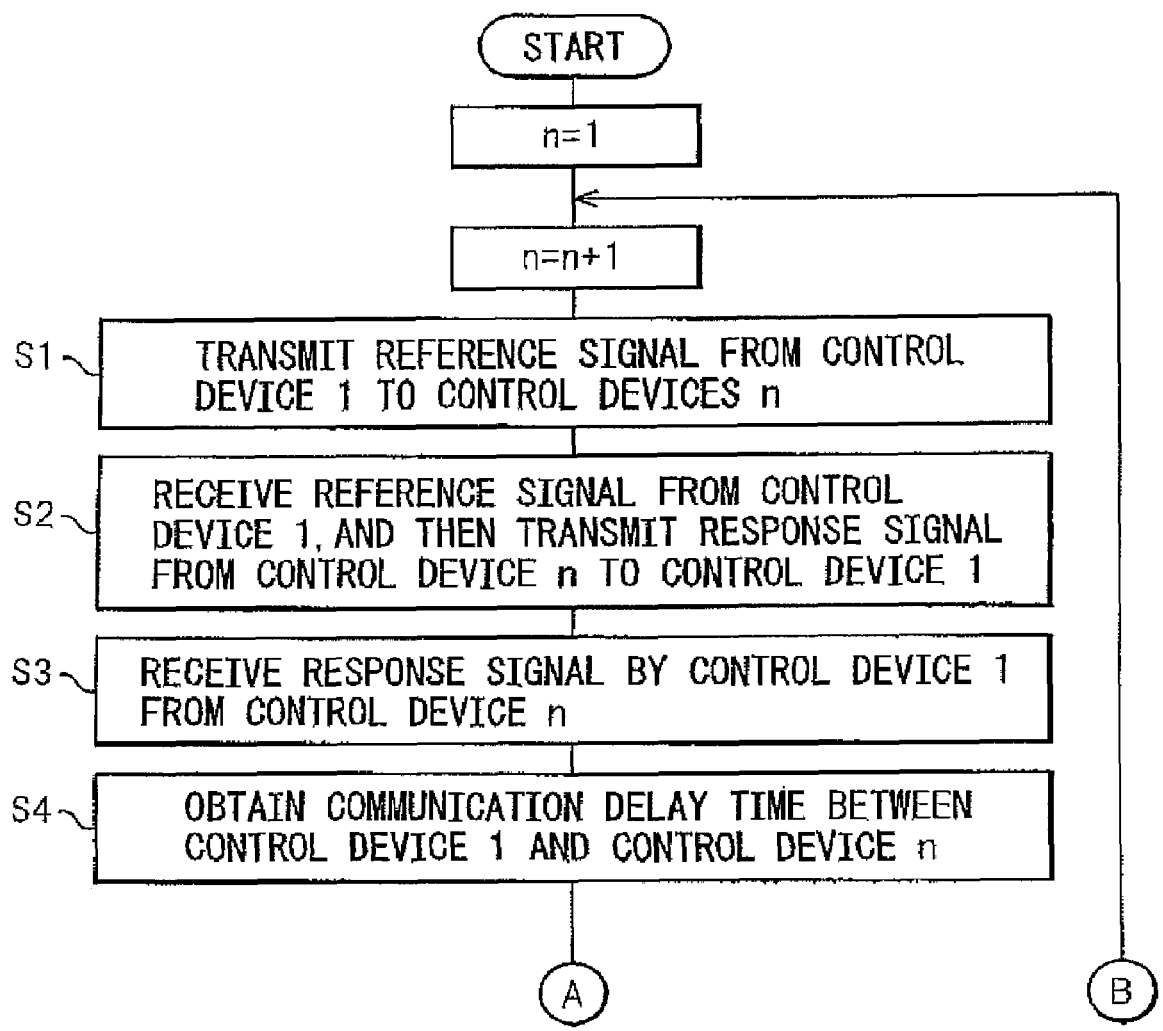

ROBOT COORDINATED CONTROL METHOD AND SYSTEM

BACKGROUND OF THE INVENTION

1. Field of the Invention

The present invention relates to a robot coordinated control method and system for coordinating operation of a plurality of robots.

2. Description of the Related Art

When each of a plurality of robot control devices controls one or more robots and the plurality of robots controlled by these plurality of robot control devices jointly perform one job, there may be a need to coordinate the operation of the plurality of robots. In this case, generally, one of the plurality of robots is made the master robot, while the other robots are made slave robots. Further, the plurality of robot control devices are connected to each other using the Ethernet® or other communication connecting means, the current position of the master robot is transmitted from the robot control device of the master robot to the robot control devices of the slave robots through the communication connecting means, and the slave robots are operated based on the transmitted position data of the master robot.

The robot control cycle is set so as to begin synchronized to an operation basic period signal generated at a constant period inside the robot control device. However, each robot control device independently generates an operation basic period signal, and therefore a deviation in the timing of generation can occur between the different robot control devices. This deviation in the timings of generation of the operation basic period signals is not a problem in cases when one robot control device controls a plurality of robots for coordinated operation. However, when using a plurality of robots controlled by different robot control devices, if trying to coordinate operation without consideration of this deviation of the timings of generation of the operation basic period signals, a problem will occur that the plurality of robots cannot be accurately operated coordinately. Further, for example Japanese Unexamined Patent Publication No. 2003-145462 discloses adjusting the time interval from when one robot control device receives an operation instruction from another robot control device to the actual operations of the robots to coordinate the operations of the robots.

However, the robot coordinated control system described in Japanese Unexamined Patent Publication No. 2003-145462 adjusts the time interval from when one robot control device receives an operation instruction from another robot control device to the actual operations of the robots by changing the minimum interruption period of the robot control devices, and therefore causes the problems of control becoming complicated.

SUMMARY OF THE INVENTION

An object of the present invention is to provide a robot coordinated control method and system which can make the robot control devices simultaneously generate operation basic period signals thereby to improve the coordination precision of the operations of a plurality of robots.

To accomplish the object, according to a first aspect of the present invention, there is provided a robot coordinated control method comprising steps of communicating among a plurality of robot control devices each generating an operation basic period signal at a predetermined period and controlling at least one robot synchronized with the operation basic period signal, and making the robots controlled by the plurality of robot control devices coordinately operate, which robot coordinated control method further comprises steps of: transmitting a reference signal from one of the plurality of robot control devices to the other robot control devices; and synchronizing the timing of generation of the operation basic period signal in each of the other robot control devices with the timing of generation of the operation basic period signal in the one of plurality of robot control devices, based on a time interval from generation of the operation basic period signal until transmission of the reference signal in the one of the plurality of robot control devices, a time interval from generation of the operation basic period signal in each of the other robot control devices until reception of the reference signal by each of the other robot control devices, and a communication delay time required for communication between the one of the plurality of robot control devices and each of the other robot control devices.

In the robot coordinated control method, for example, the one of the plurality of robot control devices is a master control device, and the other robot control devices are the slave control devices.

It is preferable to obtain the communication delay time required for communications between the one of the plurality of robot control devices and each of the other robot control devices by making each of the other robot control devices receive the reference signal transmitted from the one of the plurality of robot control devices and then making the one of the plurality of robot control devices receive a response signal transmitted from each of the other robot control devices.

For example, in the case that each of the other robot control devices receives the reference signal from the one of the plurality of robot control devices and then, after a predetermined delay time elapses, transmits the response signal to the one of the plurality of robot control devices, it is possible to use half of the time interval comprised of the time interval from when the one of the plurality of robot control devices transmits the reference signal to when it receives the response signal from each of the other robot control devices minus the predetermined delay time as the communication delay time, Still further, it is preferable to adjust the timing of generation of the operation basic period signal in each of the other robot control devices so that the time interval from generation of the operation basic period signal in each of the other robot control devices until reception of the reference signal by each of the other robot control devices is equal to the time interval comprised of the time interval from generation of the operation basic period signal until transmission of the reference signal in the one of the plurality of robot control devices plus the communication delay time.

According to the second aspect of the present invention, there is also provided a robot coordinated control system including a plurality of robot control devices each generating an operation basic period signal at a predetermined period and controlling the operation of at least one robot synchronized with the operation basic period signal, and a communication connecting means for connecting the plurality of robot control devices to each other, said plurality of robot control devices communicating with each other through the communication connecting means to coordinately operate the robots controlled by the plurality of robot control devices, wherein each of the plurality of robot control devices includes a reference signal transmitting means for transmitting a reference signal through the communication connecting means to the other robot control devices, a reference signal receiving means for receiving the reference signals transmitted from the other robot control devices through the communication connecting means, and a timer means; the reference signal transmitted from the reference signal transmitting means of the one of the plurality of robot control devices is received by the reference signal receiving means of the other robot control devices; the timing of generation of the operation basic period signal in each of the other robot control devices is synchronized with the timing of generation of the operation basic period signal in the one of the plurality of robot control devices, based on a time interval from generation of the operation basic period signal until transmission of the reference signal in the one of the plurality of robot control devices measured by the timer means of the one of the plurality of robot control devices, a time interval from generation of the operation basic period signal in each of the other robot control devices until reception of the reference signal by each of the other robot control devices measured by the timer means of each of the other robot control devices, and a communication delay time required for communication between the one of the plurality of robot control devices and each of the other robot control devices.

In the robot coordinated control system, the other robot control devices adjust their own timings of generation of the operation basic period signal so that the time interval from generation of the operation basic period signal in each of the other robot control devices until reception of the reference signal by each of the other robot control devices is equal to the time interval comprised of the time interval from generation of the operation basic period signal until transmission of the reference signal in the one of the plurality of robot control devices plus the communication delay time.

By transmitting the reference signal from one of the plurality of robot control devices to the other robot control devices and receiving it by the other robot control devices, a time interval from generation of the operation basic period signal until transmission of the reference signal in the one robot control device and a time interval from generation of the operation basic period signal until reception of the reference signal in each of the other robot control devices can be obtained, If the communication delay time between the robot control devices is known, for example, it is possible to adjust the timings of generation of the operation basic period signal in the other robot control devices so that the time interval comprised of the time interval from generation of the operation basic period signal until transmission of the reference signal in one robot control device plus a communication delay time is equal to the time interval from generation of the operation basic period signal in each of the other robot control devices until reception of the reference signal by each of the other robot control devices, there synchronizing the timings of generation of the operation basic period signal in the other robot control devices with the timing of generation of the operation basic period signal in the one robot control device.

According to the present invention, the timings of generation of the operation basic period signal in the plurality of robot control devices can be synchronized with each other. Therefore, the robots can be coordinately operated at a higher precision. Further, even if the quartz oscillators inside the robot control devices have oscillation error and deviation occurs in the timings of generation of the operation basic period signal due to the accumulation of oscillation error due to long-term continuous operation, it is possible to synchronize the timings of generation of the operation, basic period signal in a plurality of robot control devices with each other before each coordinated operation and thereby cancel out the influence of the accumulation of the oscillation error and improve the precision of the coordinated operation.

BRIEF DESCRIPTION OF THE DRAWINGS

The above and other objects, features and advantages of the present invention will be described in more detail below based on preferred embodiments of the present invention with reference to the accompanying drawings, wherein:

FIG. 2 is a timing chart for explaining the deviation of the timings of generation of the operation basic period signal of the robot control devices;

FIG. 3 is a timing chart for explaining the transmission/reception timing of the reference signal and response signal among robot control devices;

FIGS. 4A and 4B are flow charts showing an example of the procedure for synchronizing the timings of generation of the operation basic period signal in the robot control devices with each other;

DESCRIPTION OF THE PREFERRED EMBODIMENTS

Preferred embodiments of the present invention will be described below with reference to the drawings.

Figure 1:
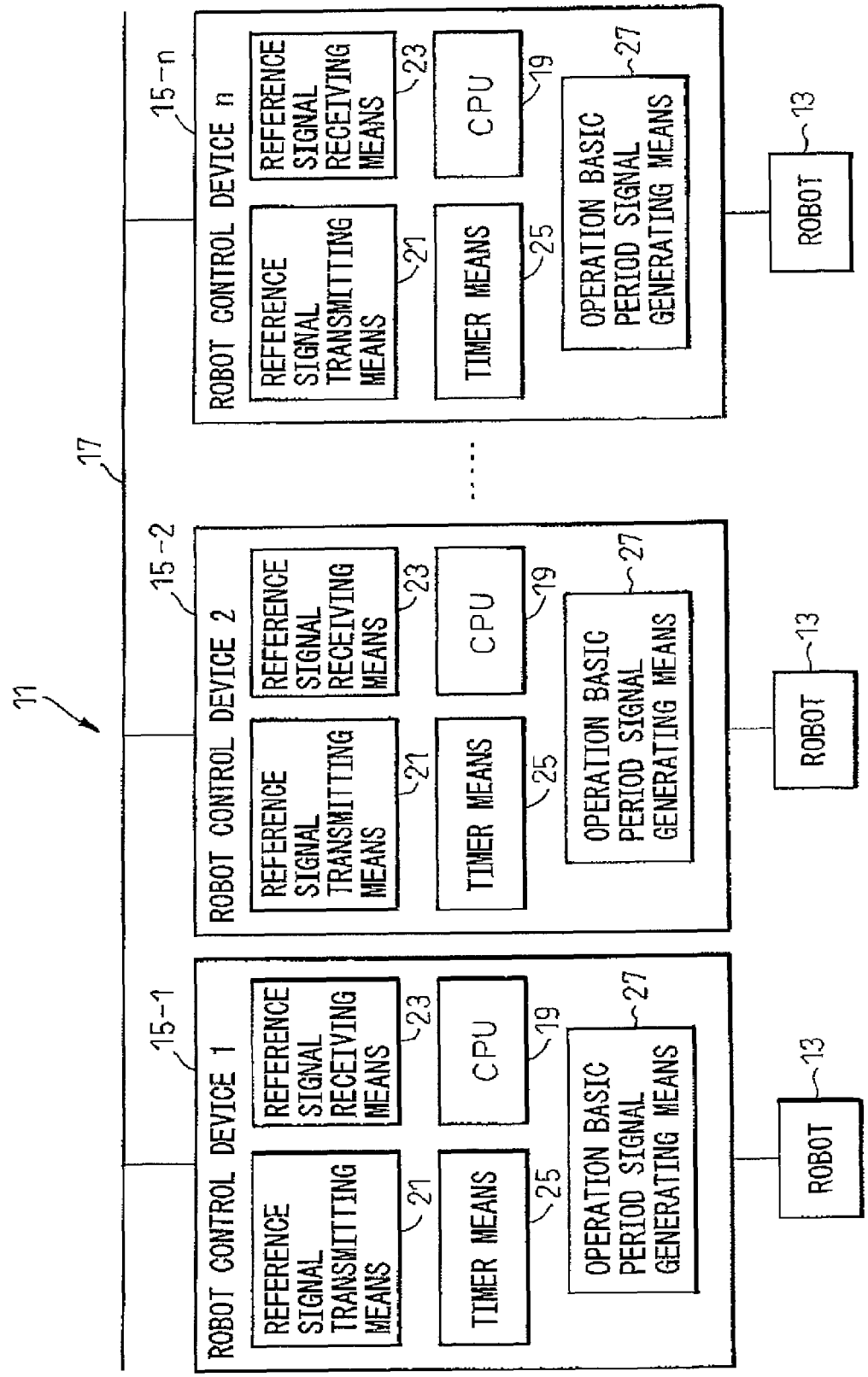
FIG. 1 is a block diagram showing the overall configuration of a robot coordinated control system according to the present invention.

FIG. 1 is a block diagram showing the overall configuration of a robot coordinated control system according to the present invention. Referring to FIG. 1, the robot coordinated control system 11 according to the present invention includes a plurality of robot control devices 15 each controlling the operation of at least one robot 13, and a communication connecting means 17 connecting the plurality of robot control devices 15 to each other. In the embodiment of FIG. 1, each robot control device 15 controls the operations of one robot 13. The robots 13 controlled by the robot control devices 15 may be any types and are not particularly limited. Further, as the communication connecting means 17, the Ethernet® etc. constructed by LAN cables etc. are used.

Normally, one among the plurality of robot control devices 15 is made a master control device, and the other robot control devices are made slave control devices. The slave control devices communicate with each other through the communication connecting means 17 for the position information etc. of the robots 13 controlled by the master control device and/or other slave control devices so as to coordinately operate the robots 13 controlled by the different robot control devices 15. Typically, the slave control devices communicate with only the master control device to obtain the current position information etc. of the robot 13 controlled by the master control device, and then coordinate the robots 13 controlled by the slave control devices with the operation of the robot 13 controlled by the master control device.

Each robot control device 15 includes a processing unit (CPU) 19 able to perform various processing, a reference signal transmitting means 21 for transmitting a reference signal to the other robot control devices 15 through the communication connecting means 17, a reference signal receiving means 23 for receiving a reference signal transmitted from the other robot control devices 15 through the communication connecting means 17, a timer means 25 for measuring time or a relative time interval, and an operation basic period signal generating means 27 for generating an operation basic period signal at a predetermined period T.

Each processing unit 19 synchronizes with the timing of generation of the operation period signal by the operation basic period signal generating means 27 to start the operation control cycle of the robot 13 and sends an operation instruction to each robot 13 in accordance with an operating program etc. input previously. The processing unit 19 may be integrated with the operation basic period signal generating means 27.

The reference signal transmitting means 21 of the master control device 15 transmits the reference signal to the other robot control devices (slave control devices) 15 after the elapse of a predetermined first delay time t1 from the generation of the operation basic period signal by the operation basic period signal generating means 27. On the other hand, the reference signal transmitting means 21 of each slave control device 15 transmits a similar reference signal to the master control device 15 after the elapse of the second delay time t2 from when receiving the reference signal from the master control device 15. One or both of the first delay time t1 and the second delay time t2 may be set to 0. Further, the reference signal may be either a 1 bit signal or a multi-byte signal so long as it can be differentiated from the operation basic period signal, Each timer means 25 is realized by a counter etc. built in the processing unit 19 and operating based on the operating clock of the processing unit 19. Since the operating clock of the processing unit 19 normally is 100 MHz or so, the resolution of the counter becomes 10 ns (nanosecond) or so and time can be measured with a high precision. The timer means 25 is mainly used for measuring the timing of generation of the operation basic period signal and the transmission/reception times of the reference signal or their relative time intervals.

Each operation basic period signal generating means 27 uses the operating clock of the processing unit 19 of the robot control device 15 to repeatedly generate the operation basic period signal at a predetermined period T. That is, each robot control device 15 generates the operation basic period signal individually by its operation basic period signal generating means 27. Therefore, as shown in FIG. 2, the timings of generation of the operation basic period signal normally are not synchronized with each other, resulting in the deviations D1, D2. Therefore, if each robot control device 15 synchronizes with the operation basic period signal generated by its own operation basic period signal generating means 27 to begin the control processing cycle of the robot, even if a certain robot control device 15 will be able to control a robot according to that data within the current operation basic period, the other robot control devices will not be able to use that data for the processing within the current operation basic period. At the next operation basic period, that data can be used to control the robot. As a result, between the robots 13 controlled by different control devices 15, deviation occurs in the timings of operations that should be performed simultaneously and the robots 13 can be no longer made to operate accurately in coordination. Therefore, the robot coordinated control system 11 and method according to the present invention can synchronize the timings of generation of the operation basic period signal between different robot control devices 15 thereby to make accurate coordinated operation of the robots possible.

Figure 4B:
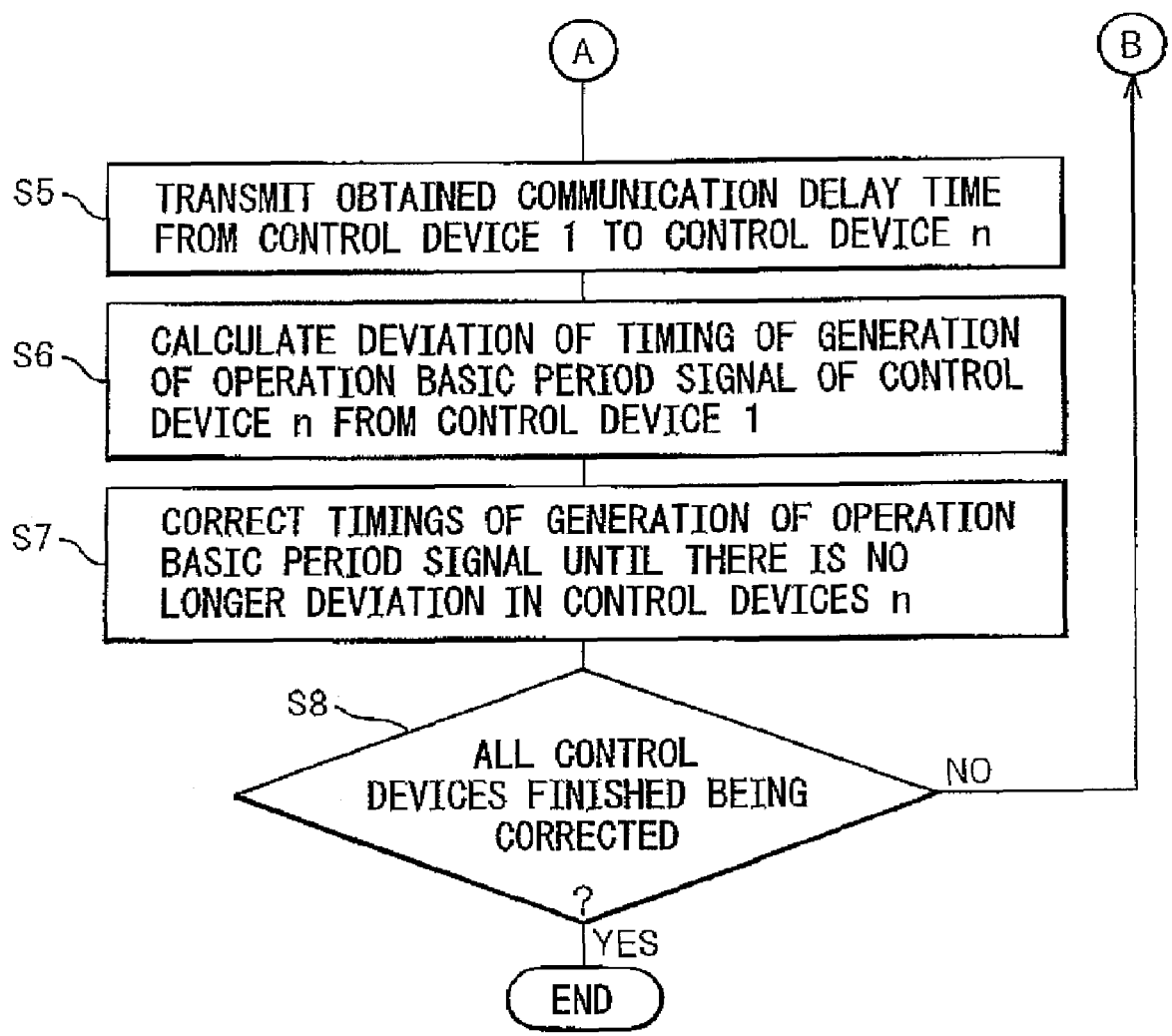

Referring to FIGS. 3, 4A, and 4B, the procedure for synchronizing the timings of generation of the operation basic period signal between different robot control devices 15 in accordance with the present invention will be explained below.

First, the operation basic period signal generating means 27 of the robot control device 15-1 (master control device) generates an operation basic period signal. Then, after the elapse of the first delay time t1 from generation of the operation basic period signal, the reference signal transmitting means 21 of the robot control device 15-1 transmits a reference signal to the robot control devices 15-n (slave control devices) (n=1 2, . . . ) (step S1). Next, when the reference signal receiving means 23 of a robot control device 15-n receives the reference signal transmitted from the robot control device 15-1 after the elapse of a communication delay time a from the transmission of the reference signal by the robot control device 15-1, the reference signal transmitting means 21 of the robot control device 15-n transmits a similar reference signal to the robot control device 15-1 as a response signal after the elapse of the second delay time t2 from the reception of the reference signal (step S2). Further, the reference signal receiving means 23 of the robot control device 15-1 receives the response signal after the communication delay time a from the transmission of the response signal by the robot control device 15-n (step S3). At this time, the robot control device 15-1 uses its own timer means 25 to measure the times of generation of the operation basic period signal (time $T_{a0}$), generation of the reference signal (time $T_{a1}$), and reception of the response signal (time $T_{a2}$), while each robot control device 15-n uses its own timer means 25 to measure the times of generation of the operation basic period signal (time$T_{b0}$), reception of the reference signal (time $T_{b1}$), and transmission of the response signal (time$T_{b2}$). Each timer means, for example, may measure the relative times of the transmission of the reference signal and the reception of the response signal based on the time of generation of the operation basic period signal in the robot control device 15-1 and the relative times of the reception of the reference signal and the transmission of the response signal based on the time of generation of the operation basic period signal in the robot control device 15-n or may measure the absolute times.

Next, the robot control device 15-1 obtains the communication delay time a based on the transmission time $T_{a1}$ of the reference signal and the reception time $T_{a2}$ of the response signal in the robot control device 15-1 and the second delay time t2 in the robot control devices 15-n or the reception time $T_{b1}$ of the reference signal and the transmission time $T_{b2}$ of the response signal in the robot control devices 15-n (step S4).

As will be understood from FIG. 3, the communication delay time a corresponds to half of the time interval of the time interval from the transmission of the reference signal by the robot control device 15-1 until the reception of the response signal from the robot control devices 15-n by the robot control device 15-1 minus the second delay time t2 in the robot control devices 15-n. That is, the communication delay time a is obtained in accordance with the next equation (1).

$$a=\{(T_{a2}-T_{a1})-t2\}/2 \qquad (1)$$

Further, in the robot control device 15-1, when the first delay time $t1(=T_{a1}-T_{a0})$ from the generation of the operation basic period signal until the transmission of the reference signal is predetermined, instead of equation (1), the communication delay time a may also be obtained by the next equation (1').

$$a=\{(T_{a2}-T_{a0})-t1-t2\}/2 \quad (1')$$

The second delay time t2 is obtained by a robot control device 15-n according to the next equation (2) using the reception time $T_{b1}$ of the reference signal and the transmission time $T_{b2}$ of the response signal measured by the timer means 25 of the robot control device 15-n. The second delay time t2 obtained by the robot control device 15-n is transmitted from the robot control device 15-n to the robot control device 15-1 through the communication connecting means 17.

$$t2=T_{b2}-T_{b1} \quad (2)$$

When the second delay time t2 is predetermined, the second delay time t2 of each robot control device 15-n may be recorded in the robot control device 15-1 beforehand, and the robot control device 15-1 may obtain the communication delay time a by using that value.

Next, the robot control device 15-1 transmits the obtained communication delay time a to each robot control device 15-n through the communication connecting means 17 (step S5). Each robot control device 15-n then calculates the deviation D ($=T_{b0}-T_{a0}$) of the timings of generation of the operation basic period signal between the robot control device 15-1 and the robot control device 15-n according to the next equation (3).

$$D=T_{b0}-T_{a0}=t1+a-t3 \quad (3)$$

Here, the time interval t3 is the time interval from the generation of the operation basic period signal (time $T_{b0}$) until the reception of the reference signal (time $T_{b1}$) in each robot control device 15-n (that is, $t3=T_{b1}-T_{b0}$). Further, the first delay time $t1(=T_{a1}-T_{a0})$ is obtained by the robot control device 15-1 from the generation time $T_{a0}$ of the operation basic period signal and the transmission time $T_{a1}$ of reference signal in the robot control device 15-1 measured by the timer means 25 of the robot control device 15-1, and the obtained time interval t1 is transmitted from the robot control device 15-1 through the communication connecting means 17 to each robot control device 15-n. When the first delay time t1 is predetermined the first delay time t1 of the robot control device 15-1 may be recorded in each robot control device 15-n beforehand, and the robot control device 15-n may obtain a deviation D using that value.

At step S6, when the deviation D of the timings of generation of the operation basic period signal between the robot control device 15-1 and the robot control device 15-n is calculated, each robot control device 15-n synchronizes the timing of generation of the operation basic period signal of the robot control device 15-1 and the timing of generation of the operation basic period signal of the robot control device 15-n by advancing the timing of generation of the operation basic period signal in the robot control device 15-n by exactly the deviation D or delaying it by exactly the deviation (T-D) (step S7).

Steps S1 to S7 are repeated in this way until the robot control devices 15 controlling all robots 13 for which coordinated operation is desired finish being corrected for the timing of generation of the operation basic period signal (step S8).

Due to this, the timings of generation of the operation basic period signal of from the robot control device 15-1 to the robot control device 15-n are synchronized with each other. Therefore, the robots 13 can be made to accurately coordinately operate.

Further, the oscillation periods of the quartz oscillators of the robot control devices 15 are not strictly the same, but have slight individual differences (that is, oscillation error). Because of this, even it the timings of generation of the operation basic period signal of the robot control devices 15 are synchronized, if operated over a long time interval, deviation may occur in the timings of generation of the operation basic period signal again due to the accumulation of oscillation error. Therefore, the above procedure of synchronizing the operation basic period signals is effective when performed before each coordinated operation.

Figure 5:
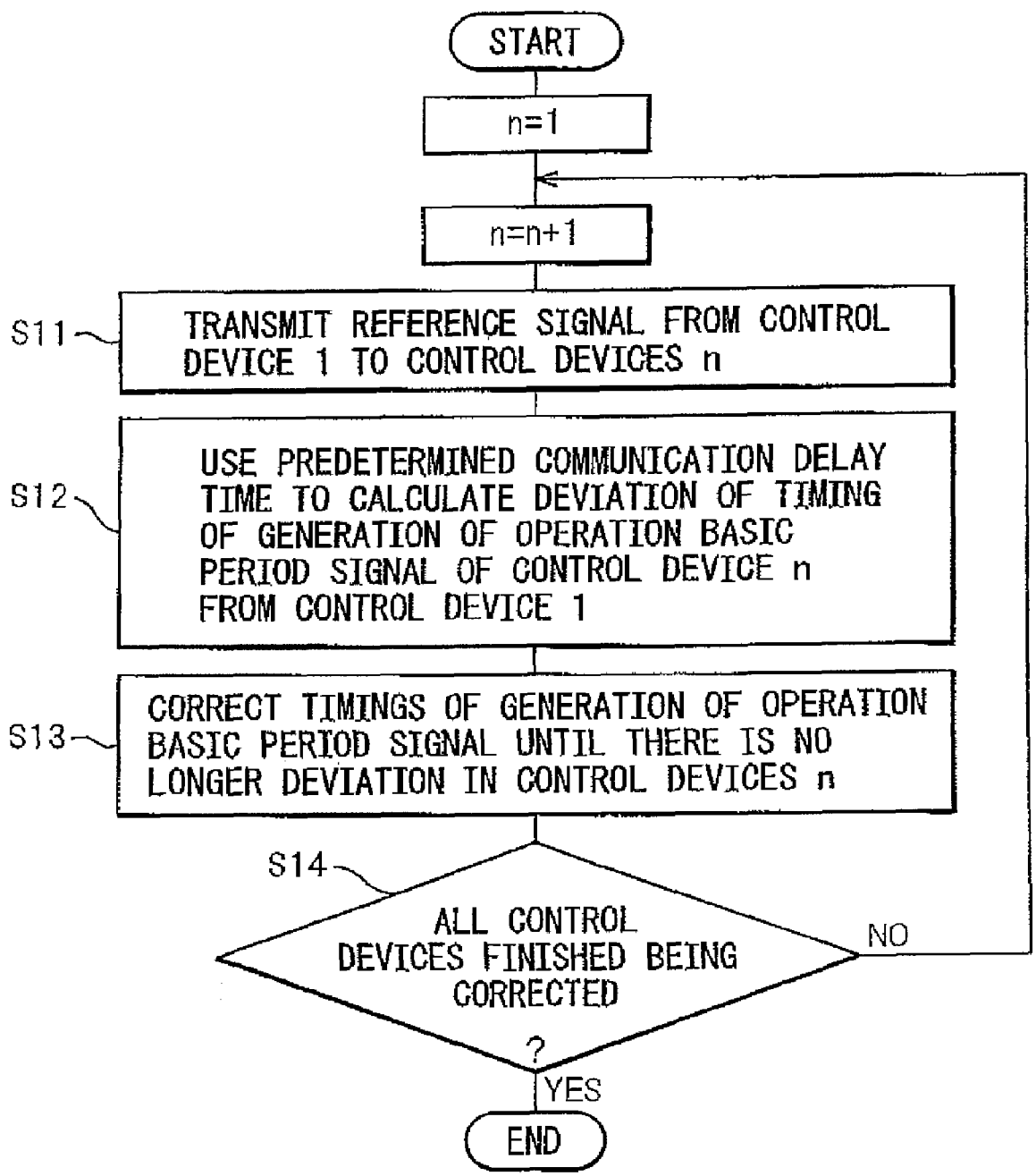
FIG. 5 is a flow chart showing another example of the procedure for synchronizing the timings of generation of the operation basic period signal in the robot control devices with each other.

In the above embodiment, the communication delay time a is obtained by performing the procedure from step S1 to step S4. However, for example, it is also possible to perform step S1 to step S4 in advance to obtain in advance the communication delay time a between the robot control device 15-1 and other robot control devices 15-2 to 15-n, store each in the robot control devices 15-2 to 15-n, and use the value of the stored communication delay time a when controlling the robots 13. In this case, the transmission of the response signal from each robot control device 15-n to the robot control device 15-1 is unnecessary. The procedure for synchronizing the timings of generation of the operation basic period signal of the robot control devices 15 with each other when the communication delay time a is obtained beforehand in like way is shown in FIG. 5. The procedures in steps S11, S12, S13, and S14 of FIG. 5 is the same as the procedures in steps S1, S6, S7, and S8 of FIGS. 4A and 4B. Therefore, detailed explanations will be omitted.

Figure 6:
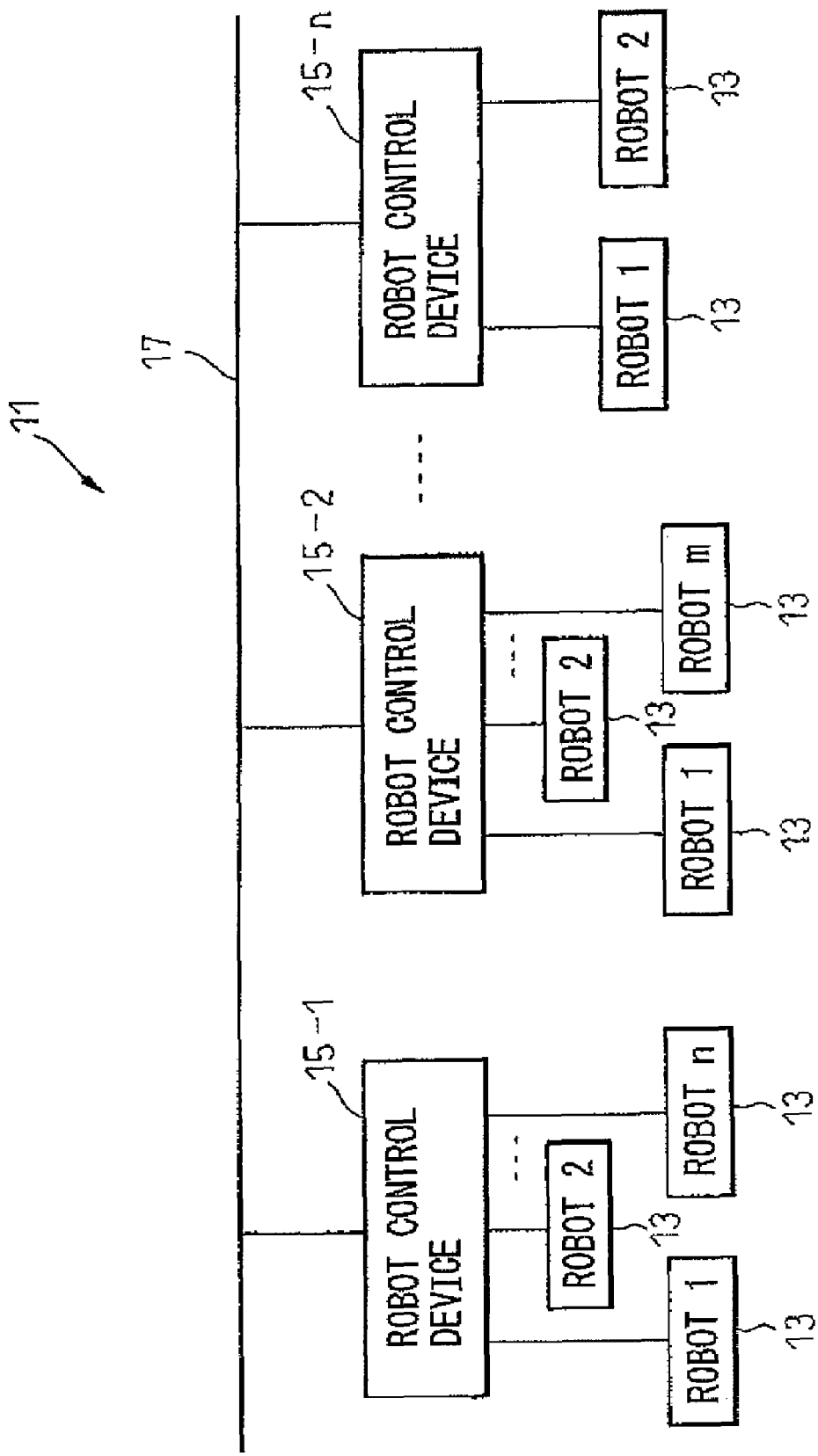
FIG. 6 is a block diagram showing another embodiment of a robot coordinated control system according to the present invention.

Further, in the above embodiments, the present invention is applied to the case where one robot control device 15 controls one robot 13. However, the present invention, as shown in FIG. 6, may of course also be applied to a case where the one robot control device 15 controls a plurality of robots 13. In the latter case, the procedure for synchronizing the timings of generation of the operation basic period signal at the robot control devices 15 with each other is the same as the procedure shown in FIGS. 4A and 4B or FIG. 5.

Still further, in the above embodiments, the timings of generation of the operation basic period signal of the slave control devices are synchronized with the operation basic period signal of the master control device. However, whether a robot control device is the master control device or is a slave control device, any robot control device may be synchronized in the timing of generation of the operation basic period signal with the timings of generation of the operation basic period signal of the other robot control devices.

What is claimed is:

1. A robot coordinated control method comprising steps of communicating among a plurality of robot control devices each generating an operation basic period signal at a predetermined period and controlling at least one robot synchronized with the operation basic period signal, and making said robots controlled by said plurality of robot control devices coordinately operate, wherein said robot coordinated control method further comprises steps of: transmitting a reference signal from one of said plurality of robot control devices to the other robot control devices; and synchronizing the timing of generation of the operation basic period signal in each of said other robot control devices with the timing of generation of the operation basic period signal in said one of said plurality of robot control devices, based on a time interval from generation of the operation basic period signal until transmission of the reference signal in said one of said plurality of robot control devices, a time interval from generation of the operation basic period signal in each of said other robot control devices until reception of the reference signal by each of said other robot control devices, and a communication delay time required for communication between said one of said plurality of robot control devices and each of said other robot control devices.

2. The robot coordinated control method according to claim 1, further comprising a step of obtaining the communication delay time required for communications between said one of said plurality of robot control devices and each of said other robot control devices by making each of said other robot control devices receive the reference signal transmitted from said one of said plurality of robot control devices and then making said one of said plurality of robot control devices receive a response signal transmitted from each of said other robot control devices.

3. The robot coordinated control method according to claim 2, further comprising steps of; making each of said other robot control devices receive the reference signal from said one of said plurality of robot control devices and then, after a predetermined delay time elapses, transmit the response signal to said one of said plurality of robot control devices; and using half of the time interval comprised of the time interval from when said one of said plurality of robot control devices transmits the reference signal to when it receives the response signal from each of said other robot control devices minus said predetermined delay time as the communication delay time.

4. The robot coordinated control method according to claim 1, further comprising a step of adjusting the timing of generation of the operation basic period signals in each of said other robot control devices so that the time interval from generation of the operation basic period signal in each of said other robot control devices until reception of the reference signal by each of said other robot control devices is equal to the time interval comprised of the time interval from generation of the operation basic period signal until transmission of the reference signal in said one of said plurality of robot control devices plus the communication delay time.

5. The robot coordinated control method according to claim 1, wherein said one of said plurality of robot control devices is a master control device, and said other robot control devices are slave control devices.

6. A robot coordinated control system comprising a plurality of robot control devices each generating an operation basic period signal at a predetermined period and controlling the operation of at least one robot synchronized with the operation basic period signal, and a communication connecting means for connecting said plurality of robot control devices to each other, said plurality of robot control devices communicating with each other through said communication connecting means to coordinately operate said robots controlled by said plurality of robot control devices, wherein each of said plurality of robot control devices comprises a reference signal transmitting means for transmitting a reference signal through said communication connecting means to the other robot control devices, a reference signal receiving means for receiving the reference signals transmitted from said other robot control devices through said communication connecting means, and a timer means; the reference signal transmitted from said reference signal transmitting means of said one of said plurality of robot control devices is received by said reference signal receiving means of said other robot control devices; the timing of generation of the operation basic period signal in each of said other robot control devices is synchronized with the timing of generation of the operation basic period signal in said one of said plurality of robot control devices, based on a time interval from generation of the operation basic period signal until transmission of the reference signal in said one of said plurality of robot control devices measured by said timer means of said one of said plurality of robot control devices, a time interval from generation of the operation basic period signal in each of said other robot control devices until reception of the reference signal by each of said other robot control devices measured by said timer means of each of said other robot control devices; and a communication delay time required for communication between said one of said plurality of robot control devices and each of said other robot control devices.

7. The robot coordinated control system according to claim 6, wherein said other robot control devices adjust their own timings of generation of the operation basic period signal so that the time interval from generation of the operation basic period signal in each of said other robot control devices until reception of said reference signal by each of said other robot control devices is equal to the time interval comprised of the time interval from generation of the operation basic period signal until transmission of the reference signal in said one of said plurality of robot control devices plus the communication delay time.

* * * * *